(12) United States Patent
Ma

(10) Patent No.: US 6,424,802 B1
(45) Date of Patent: Jul. 23, 2002

(54) PHOTOGRAPHY AID FOR REDUCING SHADOWS AND REFLECTIONS

(75) Inventor: Hai-Fei Ma, Houston, TX (US)

(73) Assignee: Baylor College of Medicine, Houston, TX (US)

( * ) Notice: Subject to any disclaimer, the term of this patent is extended or adjusted under 35 U.S.C. 154(b) by 63 days.

(21) Appl. No.: 09/642,220

(22) Filed: Aug. 18, 2000

Related U.S. Application Data

(60) Provisional application No. 60/149,974, filed on Aug. 20, 1999.

(51) Int. Cl.$^7$ ................................................. G03B 15/02
(52) U.S. Cl. ................................................. 396/4; 396/5
(58) Field of Search ............................ 396/1, 4, 5, 429

(56) References Cited

U.S. PATENT DOCUMENTS

| | | | |
|---|---|---|---|
| 2,594,758 A | | 4/1952 | Fischer |
| 4,454,210 A | * | 6/1984 | Ariyama et al. ............... 396/14 |
| 5,095,213 A | | 3/1992 | Strongin |
| 5,509,232 A | * | 4/1996 | Laubsch ......................... 47/75 |
| 5,852,896 A | * | 12/1998 | Flasch, Jr. .................... 47/48.5 |
| 6,106,124 A | * | 8/2000 | Tarsia ........................... 362/11 |

\* cited by examiner

*Primary Examiner*—David M. Gray
(74) *Attorney, Agent, or Firm*—Anthony F. Matheny; Andrews & Kurth L.L.P.

(57) ABSTRACT

The invention relates to a photography aid, and in particular to a photography aid for use with microscopes, such as stereo microscopes. The photography aid includes a reservoir adapted to contain a fluid and a holding dish. An opening is disposed between the reservoir and the holding dish and adapted to permit the fluid to pass between the reservoir and the holding dish. An object can then be placed in the holding dish and photographed.

20 Claims, 2 Drawing Sheets

PHOTOGRAPHY AID FOR REDUCING SHADOWS AND REFLECTIONS

This application claims priority from Provisional application Ser. No. 60/149,974, filed Aug. 20, 1999.

BACKGROUND OF THE INVENTION

1. Field of the Invention

This invention relates to a photography aid, and in particular, to a photography aid to be used in connection with microscopes, such as stereo microscopes.

2. Description of Related Art

In recent years, biological research in life sciences has become dependent on animal models, such as cell and tissue culture of animals, embryos, and organs. Morphological observations of these models is an important part of the research process. Therefore, photographs of the morphological observations of these models is routinely required for publication of the results of the research using these models. Accordingly, researchers need to provide clear photographs which provide sufficient detail of the model being photographed so that the photograph published is an accurate depiction of the model.

Previously, photographs taken using microscopes, and in particular, stereo microscopes, posed three problems. First, a photograph of an object, if taken using bright field illumination, was prone to cause the object to cast a shadow which would be included in the photograph. While dark field illumination could be employed to reduce the shadow, a reflection usually occurred and the details of the object being photographed, which require a bright field in order for those details to be photographed, are usually lost.

The second problem is the creation of a reflection on the photograph. Reflections usually occur when an object is photographed using dark field illumination. While bright field illumination could be employed to reduce the reflection, a shadow usually occurs and the details of the object being photographed, which require a dark field in order for those details to be photographed, are usually lost.

A third problem occurs when the photographer desires to include a color background for the object being photographed. In many instances, inclusion of color permits details of the object being photographed to be more clearly photographed. Therefore, the ability to include background color in a photograph is a desired option of photographers.

Accordingly, prior to the development of the present invention, there has been no photography aid which: reduces shadows in photographs, reduces reflections in photographs, assists to provide clear photographs, and permits background color to be included in the photographs. Therefore, the art has sought a photography aid which: reduces shadows in photographs, reduces reflections in photographs, assists to provide clear photographs, and permits background color to be included in the photographs.

SUMMARY OF INVENTION

In accordance with the invention the foregoing advantages have been achieved through the present photography aid comprising: a reservoir adapted to contain a fluid; a holding dish, wherein the holding dish is associated with the reservoir; and an opening disposed between the reservoir and the holding dish, the opening adapted to permit the fluid to pass between the reservoir and the holding dish.

A further feature of the invention is that the reservoir may include an upper portion and a lower portion. Another feature of the invention is that the upper portion of the reservoir may be disposed at a first angle with respect to the lower portion of the reservoir. Still another feature of the invention is that the holding dish may be disposed at a second angle with respect to the upper portion of the reservoir. A her feature of the invention is that the first angle may be greater than 90 degrees. Another feature of the invention is that the second angle may be less than 90 degrees. Still another feature of the invention is that the upper portion of the reservoir may be opaque. A further feature of the invention is that the lower portion of the reservoir and the holding dish may be transparent.

In accordance with the invention, the foregoing advantages have also been achieved through the present photography aid comprising: a reservoir adapted to contain a fluid, the reservoir having an upper portion and a lower portion, wherein the upper portion is disposed at a first angle with respect to the lower portion; a holding dish having at least one side wall and a bottom surface, the bottom surface being associated with the upper portion of the reservoir; and an opening in the bottom surface of the holding dish, the opening adapted to permit the fluid to pass between the reservoir and the holding dish.

A further feature of the invention is that the holding dish may be disposed at a second angle with respect to the upper portion of the reservoir. Another feature of the invention is that the lower portion of the reservoir may be cylindrically shaped. Still another feature of the invention is that the holding dish may be cylindrically shaped. A further feature of the invention is that the upper portion of the reservoir may be conically shaped. Another feature of the invention is that the first angle may be greater than 90 degrees. Still another feature of the invention is that the second angle may be less than 90 degrees.

In accordance with the invention, the foregoing advantages have also been achieved through the present photography aid comprising: a reservoir adapted to contain a fluid, the reservoir having at least one upper wall surface and at least one lower wall surface, the at least one upper wall surface being disposed at a first angle with respect to each corresponding at least one lower wall surface, the at least one lower wall surface of the reservoir being associated with a circularly shaped bottom surface having a first diameter, the at least one lower wall surface being disposed at a second angle with respect to the circularly shaped bottom surface; a holding dish having at least one side wall and a holding dish bottom surface, the holding dish bottom surface being associated with the at least one upper wall surface of the reservoir, the at least one side wall being disposed at a third angle with respect to the holding dish bottom surface; and an opening in the holding dish bottom surface, the opening adapted to permit the fluid to pass between the reservoir and the holding dish.

A further feature of the invention is that the at least one upper wall surface of the reservoir may be conically shaped. Another feature of the invention is that the first angle may be greater than 90 degrees. Still another feature of the invention is that the second angle may be about 90 degrees. A further feature of the invention is that the third angle may be less than 90 degrees.

The photography aids of the present invention have the advantages of: reducing shadows in photographs, reducing reflections in photographs, assisting to provide clear photographs, and permitting background color to be included in the photographs.

While the invention will be described in connection with the preferred embodiment, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION AND SPECIFIC EMBODIMENTS

The present invention is directed to a photography aid for taking photographs of objects such as cell and tissue cultures of animals, embryos, organs, or any other object which is desired to be photographed. While the photography aid may be used with microscopes, and in particular, stereo microscopes, it is contemplated that the photography aid of the present invention may be used to take photographs without the assistance of a microscope.

Figure 1:
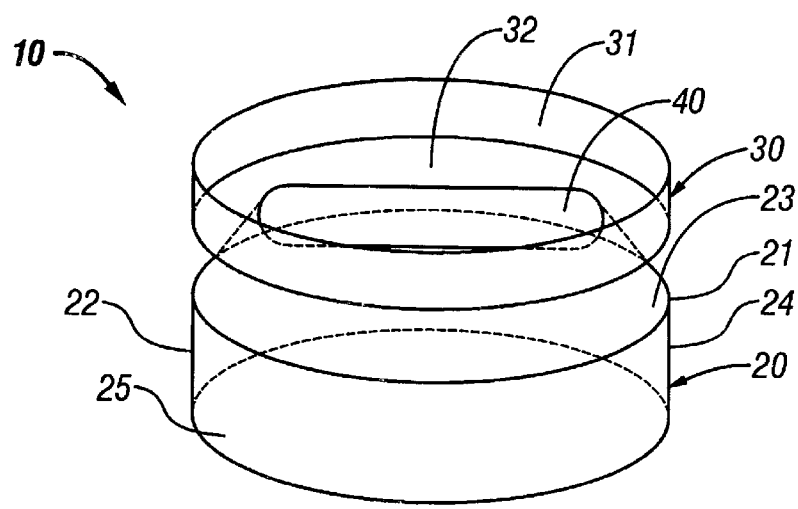
FIG. 1 is a perspective view of one specific embodiment of the photography aid of the present invention.
Figure 2:
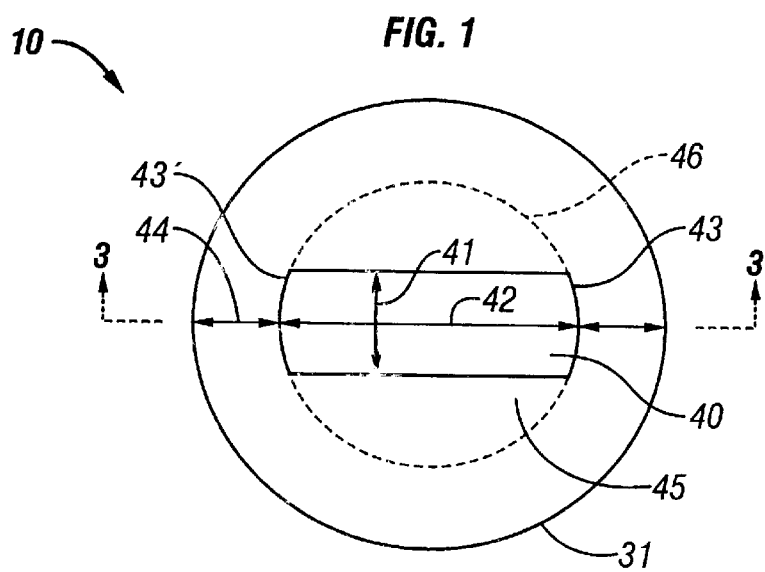
FIG. 2 is a top view of the photography aid shown in FIG. 1.
Figure 3:
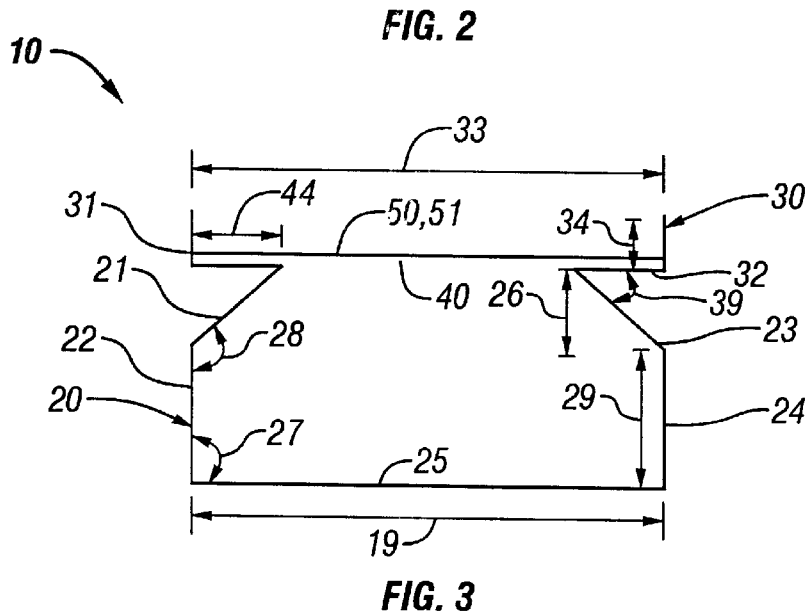
FIG. 3 is a side view of the photography aid shown in FIG. 2 taken along line 3—3 of FIG. 2.

Referring now to FIGS. 1–3, in one embodiment of the present invention, a photography aid 10 includes a reservoir 20 and a holding dish 30. The reservoir 20 is adapted to contain a fluid 50. The fluid may be any desired or necessary fluid, such as culture media for maintaining the viability of cells or tissue samples being photographed, fixing media for preserving cell or tissue samples being photographed, or other liquid, either colored or uncolored. The reservoir 20 and the holding dish 30 may be constructed out of glass, plastic, metal, or any other material desired or necessary, provided the material has the requisite strength characteristics to function in the manner hereinafter described, and the material permits, or restricts, light from passing through the material in the manner hereinafter described.

The holding dish 30 is associated with the reservoir 20. As shown in FIGS. 1–3, the holding dish 30 is preferably disposed above the reservoir 20. An opening 40 is disposed between the holding dish 30 and the reservoir 20, and opening 40 is adapted to permit the fluid to pass between the holding dish 30 and the reservoir 20.

In a preferred embodiment shown in FIGS. 1–13, the reservoir 20 includes an upper portion 21 and a lower portion 22. The upper portion 21 is formed by at least one upper wall surface 23 the shape of which depends upon the shape of the upper portion 21. For example, the upper portion 21 may be cylindrically shaped, conically shaped, polyhedral shaped, including, but not limited to, hexahedral shaped (e.g, cubed shaped), tetrahedral shaped (e.g., pyramidal shaped), or any other three dimensional shape desired or necessary, provided the shape of the upper portion 21 permits, or restricts, light passing through the upper portion 21 in the manner hereinafter described. In the event the upper portion 21 is cylindrically shaped or conically shaped, the upper portion 21 includes one upper wall surface 23 forming the cylindrical or conical shape. In the event the upper portion 21 is hexahedral shaped, a plurality of upper wall surfaces 23 are each rectangular or square shaped. In the event the upper portion 21 is pyramidal shaped, a plurality of upper wall surfaces 23 are each triangularly shaped. Other shapes and configurations of the upper portion 21 and the at least one upper wall surface 23 are readily determinable by persons skilled in the art. In the preferred embodiment shown in FIGS. 1–3, the upper portion 21 is conically shaped, and thus, includes one upper wall surface 23. The upper wall surface 23 has a height indicated by arrows 26. Height 26 of the upper wall surface 23 may be any distance desired or necessary depending upon the size of the object being photographed. In a preferred embodiment, the height 26 is about 15 millimeters.

The upper portion 21 of the reservoir 20, and thus, the at least one upper wall surface 23, may be constructed out of glass, plastic, metal, or any other material desired or necessary, provided the material has the requisite strength characteristics to function in the manner herein described and permits, or restricts, light passing though the material in the manner hereinafter described. The material out of which the upper portion 21 is constructed may be translucent or opaque. "Translucent" is herein defined as permitting light to pass through the material. "Translucent" includes clear, or transparent, materials which are defined as permitting light to pass through the material without diffusing the light so that objects on the other side can be distinctly seen. "Opaque" is herein defined as preventing substantially all light from passing through the material. In the event that the upper portion 21 is constructed out of a material which is translucent, the material may contain a coloring agent dispersed throughout the material such as a dye, pigment, or other conventional colorizing agent. Alternatively, the upper portion 21 may be covered with a thin layer of a colored plastic film. Therefore, as light passes through the upper portion 21, the light is colorized and provides a color background for the photographs taken using the photography aid 10. In the preferred embodiment, the upper portion 21 is constructed out of a material which is opaque, e.g., black glass or black plastic.

The lower portion 22 of the reservoir 20 is formed by at least one lower wall surface 24 the shape of which depends upon the shape of the lower portion 22. For example, the lower portion 22 may be cylindrically shaped, conically shaped, polyhedral shaped, including, but not limited to, hexahedral shaped (e.g, cubed shaped), tetrahedral shaped (e.g., pyramidal shaped), or any other three dimensional shape desired or necessary provided the shape of the lower portion 22 permits, or restricts, light passing through the lower portion 22 in the manner hereinafter described. In the event the lower portion 22 is cylindrically shaped or conically shaped, the lower portion 22 includes one lower wall surface 24 forming the cylindrical or conical shape. In the event the lower portion 22 is hexahedral shaped, a plurality of lower wall surfaces 24 are each rectangular or square shaped. In the event the lower portion 22 is pyramidal shaped, a plurality of lower wall surfaces 24 are each triangularly shaped. Other shapes and configurations of the lower portion 22 and the at least one lower wall surface 24 are readily determinable by persons skilled in the art. In the preferred embodiment shown in FIGS. 1–3, the lower portion 22 is cylindrically shaped, and thus, includes one lower wall surface 24. The lower wall surface 24 has a height shown by arrows 29. Height 29 of the lower wall surface 24 may be any distance desired or necessary depending upon the size of the object being photographed. In a preferred embodiment, the height 29 is about 20 millimeters.

The lower portion 22 of the reservoir 20, and thus, the at least one upper wall surface 24, may be constructed out of glass, plastic, metal, or any other material desired or necessary, provided the material has the requisite strength characteristics to function in the manner herein described and permits, or restricts, light passing though the material in the manner hereinafter described. The material out of which the lower portion 22 is constructed may be translucent or opaque. In the event that the lower portion 22 is constructed out of a material which is translucent, the material may contain a coloring agent or colored film as previously described. Therefore, as light passes through the lower portion 22, the light is colorized and provides a color background for the photographs taken using the photography aid 10. In the preferred embodiment, the lower portion 22 is constructed out of a material which is clear, e.g., clear glass or clear plastic.

The upper wall surface 23 of the upper portion 21 is disposed with respect to the lower wall surface 24 of the lower portion 22 at an angle 28. Angle 28 may be in the range from 90 degrees to 180 degrees. In an embodiment of the photography aid 10 in which the angle 28 is 180 degrees, the reservoir 20 does not include an upper portion 21 (shown in FIG. 6 discussed in greater detail below). Preferably, angle 28 is greater than 90 degrees and less than 180 degrees.

The reservoir 20 also includes a reservoir bottom surface 25. Depending upon the shape of the reservoir 20, the reservoir bottom surface 25 has a corresponding shape. For example, as shown in FIGS. 1–3, the lower portion 22 of the reservoir 20 is cylindrically shaped, therefore, the reservoir bottom surface 25 is circularly shaped. In the embodiments of the photography aid 10 which include a circularly shaped reservoir bottom surface 25, the reservoir bottom surface 25 has a diameter 19. Diameter 19 of the reservoir bottom surface 25 may be any distance desired or necessary depending upon the size of the object being photographed. In a preferred embodiment, the diameter 19 is about 80 millimeters. The reservoir bottom surface 25 is preferably constructed out of a material which is clear.

The size of the reservoir 20, i.e., the volume of the reservoir 30, may be any desired or necessary size depending upon the size of the object being photographed, regardless of the shape of the reservoir 20, or the shape of the upper portion 21 of the reservoir 20 or the lower portion 22 of the reservoir 20.

The reservoir bottom surface 25 is disposed with respect to the lower wall surface 24 at an angle 27. Angle 27 may be any angle desired or necessary provided angle 27 permits or restricts light the reservoir bottom surface 25 and the lower wall surface 24 in order to sufficiently illuminate the object being photographed. In the preferred embodiment shown in FIGS. 1–3, angle 27 is approximately 90 degrees.

The holding dish 30 includes at least one wall surface 31 the shape of which depends upon the shape of the holding dish 30. For example, the holding dish 30 may be cylindrically shaped, conically shaped, polyhedral shaped, including, but not limited to, hexahedral shaped (e.g., cubed shaped), tetrahedral shaped (e.g., pyramidal shaped), or any other three dimensional shape desired or necessary provided the shape of the holding dish 30 permits, or restricts, light passing through the holding dish 30 in the manner hereinafter described. In the event the holding dish 30 is cylindrically shaped or conically shaped, the holding dish 30 includes one wall surface 31 forming the cylindrical or conical shape. In the event the holding dish 30 is hexahedral shaped, a plurality of wall surfaces 31 are each rectangular or square shaped. In the event the holding dish 30 is pyramidal shaped, a plurality of wall surfaces 31 are each triangularly shaped. Other shapes and configurations of the holding dish 30 and the at least one wall surface 31 are readily determinable by persons skilled in the art. In the preferred embodiment shown in FIGS. 1–3, the holding dish 30 is cylindrically shaped, and thus, includes lower wall surface 31. Wall surface 31 has a height shown by arrows 34. Height 34 of the wall surface 31 may be any distance desired or necessary depending upon the size of the object being photographed. In a preferred embodiment, the height 34 is about 10 millimeters.

The holding dish 30 also includes a holding dish bottom surface 32. Depending upon the shape of the holding dish 30, the holding dish bottom surface 32 has a corresponding shape. For example, as shown in a preferred embodiment of FIGS. 1–3, the holding dish bottom surface 32 is circularly shaped. In this embodiment, the holding dish 30 has a diameter 33. The diameter 33 may be any desired or necessary diameter depending upon the size of the object being photographed. In a preferred embodiment, the diameter 33 is about 80 millimeters. The size of the holding dish 30, i.e., the volume of the holding dish 30, may be any desired or necessary size depending upon the size of the object being photographed, regardless of the shape of the holding dish 30.

The holding dish 30. the at least one wall surface 31, and the holding dish bottom surface 32 may be constructed out of glass, plastic, metal, or any other material desired or necessary, provided the material has the requisite strength characteristics to function in the manner herein described and permits, or restricts, light passing though the material in the manner hereinafter described. The material from which the holding dish 30, the at least one wall surface 31, and the holding dish bottom surface 32 are constructed may be translucent or opaque. In the event that the holding dish 30, the at least one wall surface 31, and the holding dish bottom surface 32 are constructed out of a material which is translucent, the material may contain a coloring agent or colored film as previously described. Therefore, as light passes through the holding dish 30, the at least one wall surface 31, and the holding dish bottom surface 32, the light is colorized and provides a color background for the photographs taken using the photography aid 10. In a preferred embodiment, the holding dish 30, the at least one wall surface 31, and the holding dish bottom surface 32 are constructed out of a material which is clear, e.g., clear glass or clear plastic.

The holding dish bottom surface 32 includes an opening 40. Opening 40 is disposed between the holding dish 30 and reservoir 20 and is adapted to permit fluid to pass between the holding dish 30 and the reservoir 20. Opening 40 may have any desired or necessary shape depending upon the size of the object being photographed and the amount of light required for sufficient illumination of the object. For example, opening 40 may be circularly shaped, triangularly shaped, rectangularly shaped, square shaped, or any other shape. Further, the size of the opening 40 may be any desired or necessary size depending upon the size of the object being photographed and the amount of light required for sufficient illumination of the object.

As shown in FIGS. 1–3, the opening 40 has a substantial rectangular shape having an opening width shown by arrows 41 and an opening length shown by arrows 42. As shown in FIGS. 1–2, the opening length 42 is not constant, but instead varies along arcs 43, 43' formed by the intersection 46 of the upper portion 21 of the reservoir 20 and the holding dish bottom surface 32. While the opening width 41 and opening length 42 can be any distances desired or necessary depending upon the size of the object being photographed and the amount of light required for sufficient illumination of the object, in a preferred embodiment, the opening width 41 is approximately 20 millimeters and the opening length 42 is approximately 50 millimeters at its greatest distance along arcs 43, 43'.

Arcs 43, 43' are formed by the intersection 46 of the upper portion 21 of the reservoir 20 and the holding dish bottom surface 32. Arcs 43, 43' are disposed at a distance 44 from the wall surface 31. While the distance 44 can be any distance desired or necessary, in a preferred embodiment, distance 44 is approximately 15 millimeters.

In a preferred embodiment, in which the upper portion 21 is constructed out of a material which is opaque and the holding dish bottom surface 32 is constructed out of a material which is clear, light is permitted to pass through the reservoir in an upward direction in FIGS. 1 and 3 and through the opening 40 and an inner area 45 formed by the intersection 46 of the upper portion 21 of the reservoir 20 and the holding dish bottom surface 32 of the holding dish 30.

In the embodiment shown in FIGS. 1–3, the holding dish 30 is disposed with respect to the reservoir 20 at an angle 39. Angle 39 may be in the range from at least about 0 degrees to 90 degrees. In an embodiment of the photography aid 10 in which angle 39 is 0 degrees, the reservoir 20 does not include an upper portion 21 (shown in FIG. 6 discussed in greater detail below). Preferably, as shown in FIGS. 1–3, angle 39 is greater than 0 degrees and less than 90 degrees.

Figure 4:
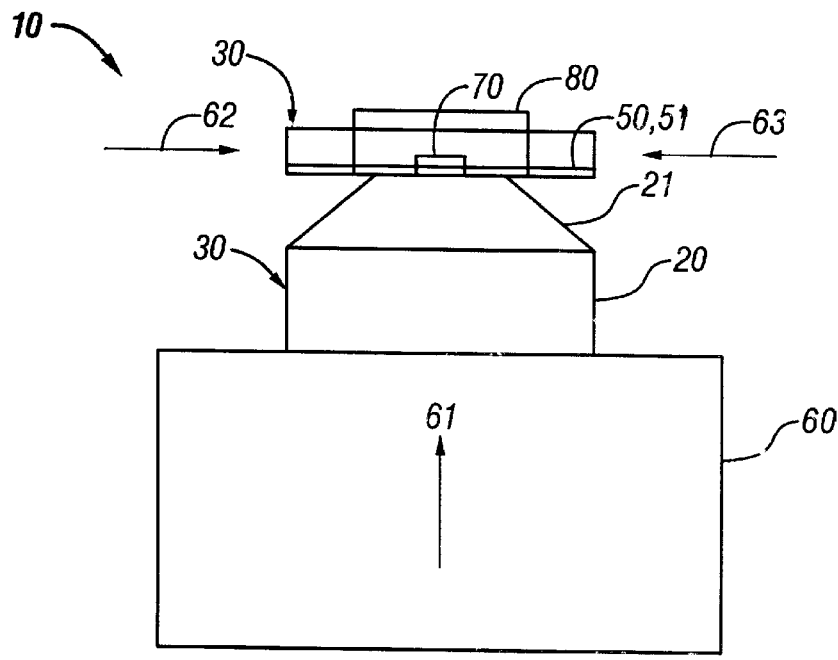
FIG. 4. is a side view of the photography aid shown in FIG. 1 showing one specific use of the photography aid in conjunction with sources of light.

Referring now to FIG. 4, the photography aid 10 of FIGS. 1–3 is placed upon a transmitted light stand 60. An object 70 to be photographed is placed in an object dish 80 which is then placed in the holding dish 30 of the photography aid 10. Light is transmitted in the direction of 61 from the transmitted light stand 60. Preferably, light is also transmitted toward object 70 in the directions indicated by the arrows 62 and 63 using at least two fiber optic light sources (not shown). Preferably, four fiber optic light sources are employed to illuminate the object 70.

Optionally, colored fluid 51 may be placed in the reservoir 30 and the holding dish 20 in the event the user of the photography aid 10 desires, or requires, color background in the photograph to more accurately photograph the details of the object 70. Alternatively, the photography aid 10 may be constructed out of colorized, translucent material and clear fluid may be contained in the reservoir 30 to provide the desired or necessary color background for the photographs. In the arrangement shown in FIG. 4, air bubbles underneath the object dish 80 should be substantially eliminated.

Figure 5:
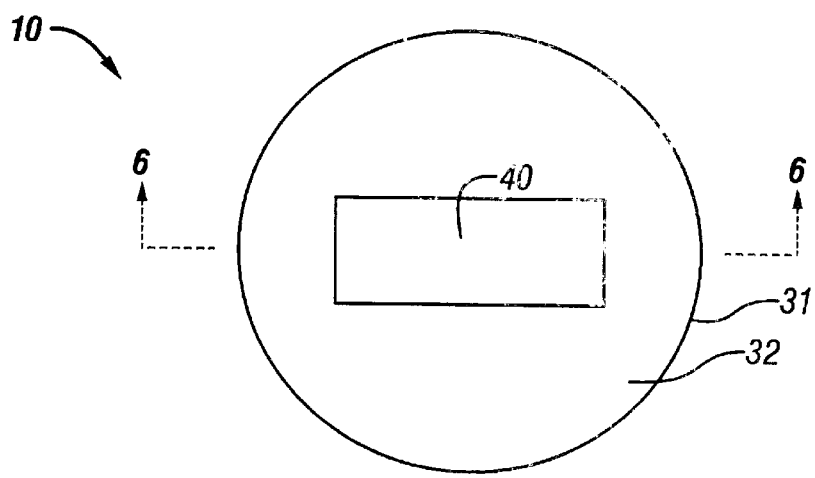
FIG. 5 is a top view of another embodiment of the photography aid of the present invention.
Figure 6:
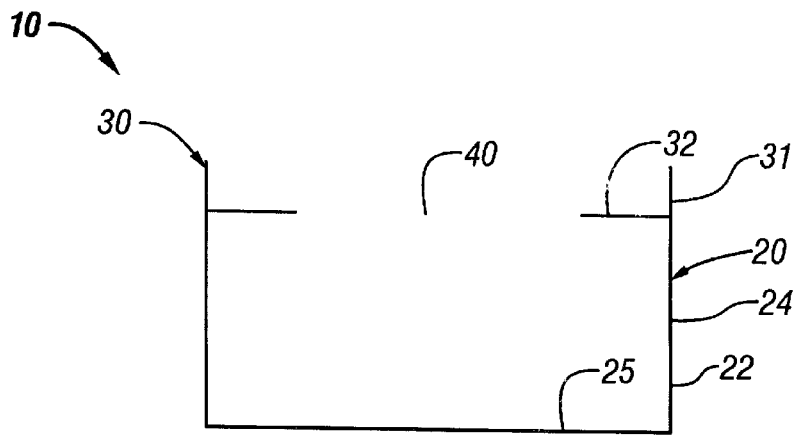
FIG. 6 is a side view of the photography aid shown in FIG. 5 taken along line 6—6 of FIG. 5.

Referring now to FIGS. 5–6, in another specific embodiment of the photography aid, the reservoir 20 includes a lower portion 22 and a bottom surface 25 and at least one lower wall surface 24 depending upon the shape of the reservoir 20. As discussed in greater detail above, the reservoir 20 may be any shape desired or necessary. As shown in FIGS. 5–6, the reservoir 20 is cylindrically shaped. Accordingly, the reservoir 20 includes one lower wall surface 24.

A holding dish 30 is associated with the reservoir 20 and an opening 40 is disposed between the holding dish 30 and the reservoir 20. As discussed in greater detail above, opening 40 permits fluid 50 to pass between the reservoir 20 and the holding dish 30 as discussed in greater detail above. Opening 40 can be any desired or necessary size and shape. As shown in FIG. 5, opening 40 is rectangularly shaped.

As discussed above with respect to FIGS. 1–3 the holding dish 30 also includes at least one wall surface 31 and a holding dish bottom surface 32 which separates the contents in the reservoir 20 from the contents in the holding dish. The at least one wall surface 31 and the holding dish bottom surface may be transparent or opaque. In this embodiment, the at least one wall surface 31 is preferably constructed out of a material which is clear and the entire holding dish bottom surface 32 is preferably constructed out of a material which is opaque. Therefore, light passing through the reservoir 20 into the holding dish 30 (in an upwards direction in FIG. 6) is permitted to pass through the opening 40, but not through the holding dish bottom surface 32.

Alternatively, only a portion of the holding dish bottom surface 32 is constructed out of a material which is opaque. Therefore, light is permitted to pass through the opening 40 and at a least a portion of the holding dish bottom surface 32 as desired or necessary.

It is to be understood that the invention is not limited to the exact details of construction, operation, exact materials, or embodiments shown and described, as obvious modifications and equivalents will be apparent to one skilled in the art. For example, the photography aid 10, or the individual components of the photography aid 10, may be constructed out of a material which is translucent so that other devices, such as paper or tape, may be used to block light passing through desired or necessary areas of the photography aid 10. Further, the reservoir 20 and the holding dish 30 may be formed integral with each other or as separate components. Also, the photography aid 10, or any individual components of the photography aid 10, may be constructed out of uncolored, translucent material, including, but not limited to, clear glass or clear plastic, and colored dye may be included in the fluid contained in the reservoir, thereby permitting photographs with a desired or necessary colored background to be taken using the photography aid. Moreover, the upper portion 21 of the reservoir 30 may be constructed out of translucent material and the holding dish bottom surface 32, or a portion of the holding dish bottom surface 32, may be constructed out of an opaque material, thereby permitting light to pass through only desired or necessary areas of the photography aid. Accordingly, the invention is therefore to be limited only by the scope of the appended claims.

What is claimed:

1. A photography aid comprising:
    a reservoir adapted to contain a fluid, the reservoir having at least one upper wall surface;
    a holding dish having a holding dish bottom surface, wherein the holding dish bottom surface is in communication with the at least one upper wall surface; and
    an opening disposed between the at least one upper wall surface and the holding dish bottom surface, the opening adapted to permit the fluid to pass between the reservoir and the holding dish.

2. The photography aid of claim 1, wherein the reservoir includes an upper portion and a lower portion.

3. The photography aid of claim 2, wherein the upper portion of the reservoir is disposed at a first angle with respect to the lower portion of the reservoir.

4. The photography aid of claim 2, wherein the holding dish is disposed at a second angle with respect to the upper portion of the reservoir.

5. The photography aid of claim 3, wherein the first angle is greater than 90 degrees.

6. The photography aid of claim 4, wherein the second angle is less than 90 degrees.

7. The photography aid of claim 6, wherein the upper portion of the reservoir is opaque.

8. The photograph aid of claim 7, wherein the lower portion of the reservoir and the holding dish are transparent.

9. A photography aid comprising:
- a reservoir adapted to contain a fluid, the reservoir having an upper portion and a lower portion, wherein the upper portion is disposed at a first angle with respect to the lower portion;
- a holding dish having at least one side wall and a bottom surface, the bottom surface being associated with the upper portion of the reservoir; and
- an opening in the bottom surface of the holding dish, the opening adapted to permit the fluid to pass between the reservoir and the holding dish.

10. The photography aid of claim 9, wherein the holding dish is disposed at a second angle with respect to the upper portion of the reservoir.

11. The photography aid of claim 10, wherein the lower portion of the reservoir is cylindrically shaped.

12. The photography aid of claim 11, wherein the holding dish is cylindrically shaped.

13. The photography aid of claim 12, wherein the upper portion of the reservoir is conically shaped.

14. The photography aid of claim 13, wherein the first angle is greater than 90 degrees.

15. The photography aid of claim 14, wherein the second angle is less than 90 degrees.

16. A photography aid comprising:
- a reservoir adapted to contain a fluid, the reservoir having at least one upper wall surface and at least one lower wall surface, the at least one upper wall surface being disposed at a first angle with respect to each corresponding at least one lower wall surface, the at least one lower wall surface of the reservoir being associated with a circularly shaped bottom surface having a first diameter, the at least one lower wall surface being disposed at a second angle with respect to the circularly shaped bottom surface;
- a holding dish having at least one side wall and a holding dish bottom surface, the holding dish bottom surface being associated with the at least one upper wall surface of the reservoir, the at least one side wall being disposed at a third angle with respect to the holding dish bottom surface; and
- an opening in the holding dish bottom surface, the opening adapted to permit the fluid to pass between the reservoir and the holding dish.

17. The photography aid of claim 16, wherein the at least one upper wall surface of the reservoir is conically shaped.

18. The photography aid of claim 16, wherein the first angle is greater than 90 degrees.

19. The photography aid of claim 16, wherein the second angle is about 90 degrees.

20. The photography aid of claim 16, wherein the third angle is less than 90 degrees.

* * * * *